(12) United States Patent
Dimov et al.

(10) Patent No.: US 8,976,434 B2
(45) Date of Patent: Mar. 10, 2015

(54) APPARATUS AND METHOD FOR COLLIMATING DIFFUSED LIGHT USING A COMPOUND HOLOGRAPHIC OPTICAL ELEMENT

(75) Inventors: Fedor Dimov, Redondo Beach, CA (US); Khin Swe Yin, Alhambra, CA (US); Kevin Yu, Temple City, CA (US); Engin Arik, Moorpark, CA (US); Dmitry Voloschenko, Torrance, CA (US)

(73) Assignee: Luminit LLC, Torrance, CA (US)

( * ) Notice: Subject to any disclaimer, the term of this patent is extended or adjusted under 35 U.S.C. 154(b) by 56 days.

(21) Appl. No.: 13/339,942

(22) Filed: Dec. 29, 2011

(65) Prior Publication Data

US 2012/0170090 A1   Jul. 5, 2012

Related U.S. Application Data

(60) Provisional application No. 61/428,929, filed on Dec. 31, 2010.

(51) Int. Cl.
*G02B 5/32* (2006.01)
*G02B 27/30* (2006.01)

(52) U.S. Cl.
CPC . *G02B 5/32* (2013.01); *G02B 27/30* (2013.01)
USPC .............................. 359/20; 359/641

(58) Field of Classification Search
USPC ......................... 359/15, 16, 19, 20
See application file for complete search history.

(56) References Cited

U.S. PATENT DOCUMENTS

| | | | |
|---|---|---|---|
| 5,422,746 A | 6/1995 | Aharoni et al. | |
| 5,450,378 A * | 9/1995 | Hekker | 369/103 |
| 5,999,281 A | 12/1999 | Abbott et al. | |
| 7,443,587 B2 * | 10/2008 | Dickson et al. | 359/566 |
| 2005/0248820 A1 | 11/2005 | Moser et al. | |

OTHER PUBLICATIONS

Gruabe et al. "Holographic Lens for Pilot's Head Up Display,", Feb. 1, 1976, Hughes Research Laboratories, pp. 1-117.*
PCT Search Report for related Application No. PCT/US2011/067807 dated Sep. 26, 2012.
International Preliminary Report for related PCT App. No. PCT/US2011/067807 dated Jul. 11, 2013.

* cited by examiner

*Primary Examiner* — Scott J Sugarman
*Assistant Examiner* — Robert E Tallman
(74) *Attorney, Agent, or Firm* — Husch Blackwell LLP (57) ABSTRACT

A collimator can be made of a compound holographic optical element made of three holographic optical elements. The first reflection holographic optical element will have recorded within it continuous lens configured to receive light from a diffuse light beam and diffract the received light as a first collimated light beam. The second reflection holographic optical element will have recorded within it a regular hologram that is configured to permit the light from the diffuse light source to transmit through it to reach the first reflection holographic element, the second reflection holographic element having within it a second holographically reflective structure configured to receive the first collimated light beam and diffract the first collimated light beam as a second collimated light beam. The third transmission holographic optical element is configured to receive the second collimated light beam and diffract it as a third holographic light beam.

3 Claims, 10 Drawing Sheets

APPARATUS AND METHOD FOR COLLIMATING DIFFUSED LIGHT USING A COMPOUND HOLOGRAPHIC OPTICAL ELEMENT

CROSS-REFERENCE TO RELATED APPLICATION

This application claims the benefit of U.S. Provisional Application No. 61/428,929 entitled "Apparatus and Method for Collimating Diffused Light Using a Compound Holographic Optical Element" filed on Dec. 31, 2010.

BACKGROUND OF THE INVENTION

Ideal collimation of diffuse incandescent radiation light contradicts the second law of thermodynamics. Lakes, R. S. and Vick, G., "Partial collimation of light from a diffusely reflective source," adapted from J. Modern Optics, 39, 2113-2119, (1992). Using a simple light baffle it is possible to limit the cone angle of the diffused light, but baffling is not collimation because the baffled rays are not redirected to be congruent with the cone angle, but rather are lost. Nevertheless, at a narrow wavelength bandwidth, or with a coherent light source it is possible to collimate the diffuse light using holograms. A well-known method of collimating light from a diffuser is based on the precise positioning of the diffuser during playback in the same place in which it was recorded and playing back with the same collimated reference beam. This is impractical because it is defeated if there is even a minor change in the playback setup compared to the recording setup.

BRIEF SUMMARY OF THE INVENTION

A collimator can be made of a compound holographic optical element made of three holographic optical elements. The first reflection holographic optical element will have recorded within it continuous lens configured to receive light from a diverging light beam and diffract the received light as a first collimated light beam. The second reflection holographic optical element will have recorded within it a regular hologram that is configured to permit the light from the diverging light source to transmit through or it to reach the first reflection holographic element, the second reflection holographic element having within it a second holographically reflective structure configured to receive the first collimated light beam and diffract the first collimated light beam as a second collimated light beam. The third holographic optical element is configured to receive the second collimated light beam and diffract it as a third holographic light beam.

DETAILED DESCRIPTION OF THE PREFERRED EMBODIMENTS

One operable configuration of collimating diffused light with a holographic optical element has the collimated beam after the holographic optical element (HOE) being directed in the same direction as the beam illuminating the diffuser. When manufactured for high efficiency, the holographic optical element can be a thick Bragg hologram otherwise known as a volume hologram. Thick holographic optical elements can have diffraction efficiencies up to 100% theoretically and can efficiently redirect beams in any direction, focusing or defocusing them depending on how the holographic optical elements were recorded. It should be kept in mind that the thick holographic optical elements are wavelength and angle selective. This selectivity limits the amount of the light a holographic optical element can accept for collimation. Decreasing holographic angular or wavelength selectivity to increase the amount of accepted light can be achieved in different ways: for example, by reducing hologram thickness, or by applying specific recording setups. For holographic thin film polymers, thickness reduction is principally limited by the relatively low changes in the index of refraction at the points of constructive interference recorded within current recording media. Those relatively low changes in index of refraction can reduce the phase shift of the retrieving beam, and accordingly reduce the diffraction efficiency if the recording medium is not sufficiently thick.

Figure 1:
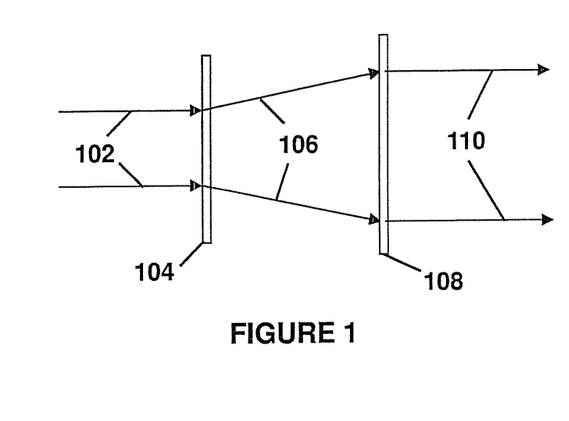
FIG. 1 illustrates the desired action for collimating diffused light.
Figure 2:
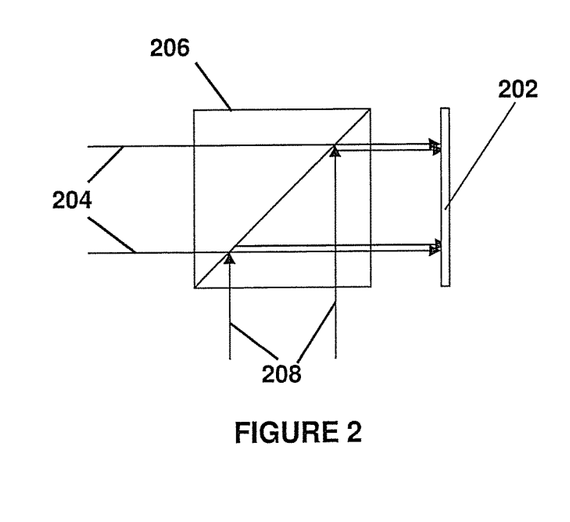
FIG. 2 illustrates a configuration that would fail to collimate diffused light with two reflection holograms.
Figure 3:
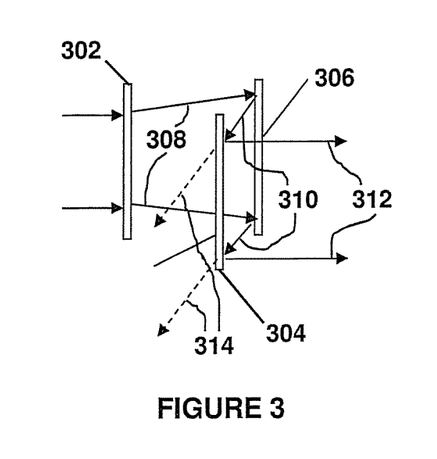
FIG. 3 illustrates a setup that would fail to record an efficient single transmission hologram for collimating diffused light.

FIGS. 1-3 are diagrammed configurations of one transmission or two reflection hologram solutions that fail to collimate diffuse light. FIG. 1 shows the desired action for collimating diffused light; FIG. 2 demonstrates a setup that would fail to collimate diffused light with two reflection holograms; FIG. 3 demonstrates a configuration that would fail to record an efficient single transmission hologram for collimating diffused light.

Referring to FIG. 1, source beam 102 strikes diffuser 104. The diffused beam 106 then impinges on a collimator 108 that provides a collimated beam 110. As desired, the outcome is that the source beam 102 is diffused and then output as collimated beam 110 substantially in the same direction of travel as the source beam 102.

Referring to FIG. 2, a recording medium 202 is recorded by having reference beam 204 pass through a beamsplitter 206 on its way to the recording medium and having object beam 208 deflected by the beamsplitter toward the recording medium. While it is not shown on the diagram, those of ordinary skill in the art will recognize that reference beam 204 and object beam 208 originate at the same laser source and have the same wavelength. The recorded hologram resulting from this setup (not shown) will have very low diffraction efficiency because the period of the hologram interference fringes of reference beam 204 and object beam 208 will be close to infinity.

Referring to FIG. 3, the playback setup consists of a diffuser 302, a first reflection hologram 304, and second reflection hologram 306. First reflection hologram 304 is configured to permit light from the diffuser 302 pass through it. Therefore, the second reflection hologram 306 is the first of the holograms 304 and 306 to operatively couple to the diffused light 308 coming from the diffuser 302. Second reflection hologram 306 directs a first diffracted beam 310 back towards first reflection hologram 304. The first diffracted beam 310 then operatively couples to first reflection hologram 304 and is output as second diffracted beam 312. The setup shown in FIG. 3 will not work due to the diffraction of the diffused light 308 back by the first reflection hologram. So, before the diffused light reaches second reflection hologram 306 it will be partially diverted into back-diffracted beam 314.

In an embodiment of the invention, the holograms are rather thin (about 10-20 microns). The holograms may be thicker and depending on developments in recording media or the degree of collimation desired, may be thinner as well. The holograms are desirably laminated to each other so that the beams do not shift significantly when they diffract at an angle and transmit to hit next hologram.

Figure 4:
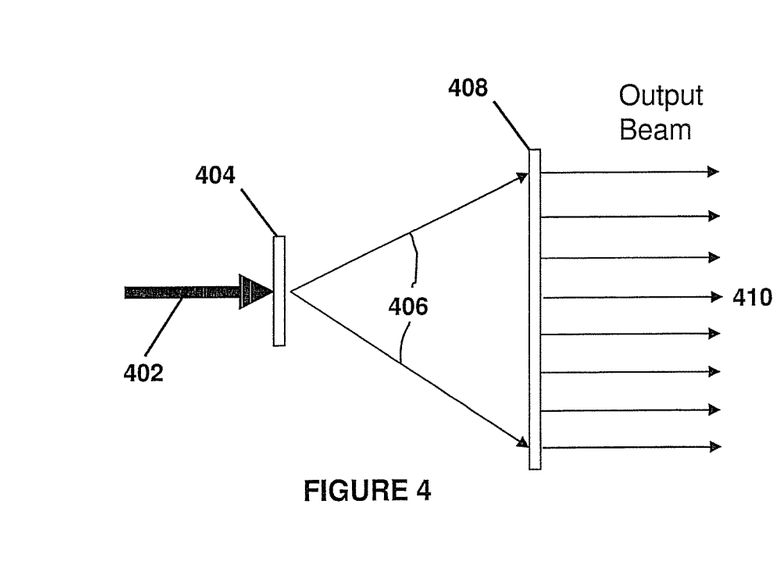
FIG. 4 shows the assembled diffused light collimation holographic optical element played back with a diffuse laser hot spot.
Figure 5:
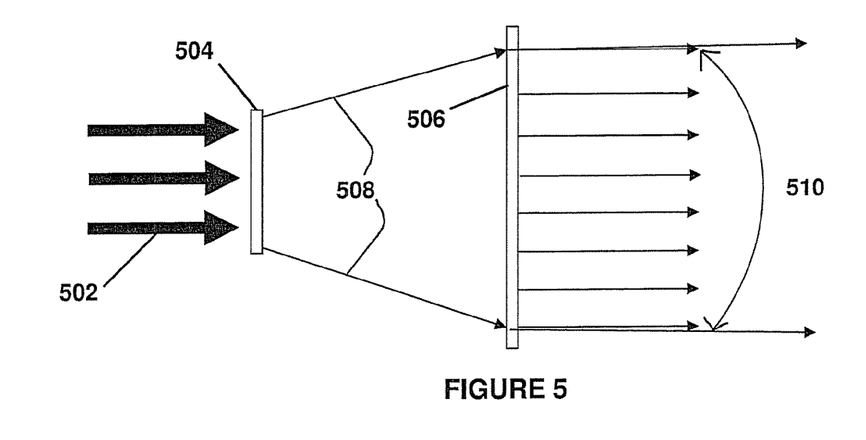
FIG. 5 shows the assembled diffused light collimation holographic optical element played back with a laser illuminated large diffuser.
Figure 6:
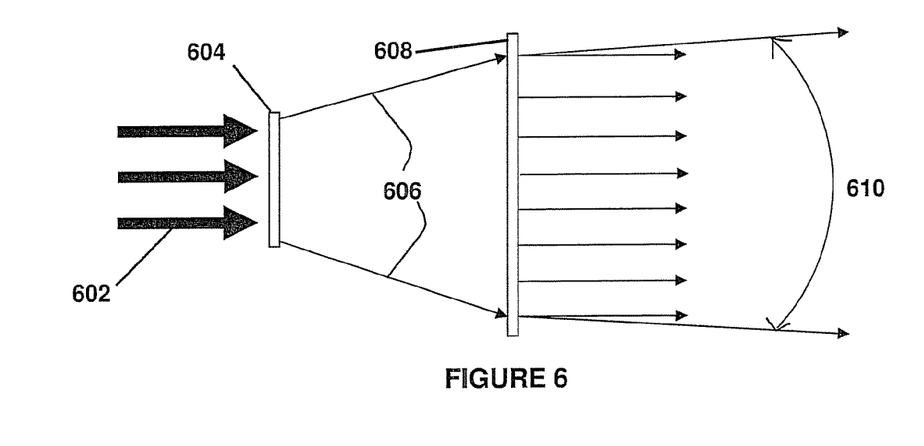
FIG. 6 shows the assembled diffused light collimation holographic optical element played back with a broadband LED illuminated large diffuser.

FIGS. 4-6 show views of the assembled diffused light collimation holographic optical element played back with: a diffused laser hot spot, as in FIG. 4, a laser-illuminated large area diffuser as in FIG. 5, and a large diffuser illuminated by a broadband light emitting diode light source as shown in FIG. 6. In the cases illustrated in FIGS. 4 and 5 the playback is monochrome, and in the case illustrated in FIG. 6 the playback is broadband beam. As is shown in FIGS. 4-6, the diffusers are positioned in the holographic optical elements' focal planes. The best collimation is achieved in the case of FIG. 4 by illuminating the diffuser with the narrow laser beam, and adjusting the distance between the diffuser and the holographic optical element to be the focal length of the holographic optical element. Adequate collimation can be achieved in the cases of FIG. 5 and FIG. 6. If the diffuser size, its position and the light emitting diode bandwidth is coordinated with the holographic optical element selectivity parameters; to improve efficiency, each light emitting diode can have a wavelength bandwidth not wider than the hologram bandwidth recorded for the appropriate color, and the diffuser field points are within holograms acceptance Bragg angle.

Referring to FIG. 4, a narrow laser beam 402 impinges on diffuser 404. The light is diffused with a diffusion cone 406 being defined by the intensity of the light being half of that of the maximum intensity location ("full-width at half-maximum" or FWHM). The holographic optical element 408 renders the diffused light into collimated light 410. Given a sufficiently narrow laser beam and a sufficiently precise holographic optical element, the result will be almost perfectly collimated light.

Referring to FIG. 5, should the light source be expanded, such as an expanded laser beam 502 after the expanded laser beam strikes the diffuser 504 each location on holographic optical element 506 will be illuminated from multiple points on the diffuser. This is represented by the expanded diffusion cone 508. During recording of holographic optical element 506 the holographic structure created within the recording medium (not shown) will accept light from multiple incoming paths. The result is that the collimated light 510 does not emanate perfectly collimated but with rays that may diverge by about one percent to about two percent in an embodiment of the invention.

Referring to FIG. 6, if a broadband light beam 602 is used, then the diffuser 604 will spread that light into a diffusion cone beam 606. When the beam 606 impinges on the holographic optical element 608, it will be output in as collimated light 610 that can have a divergence of about four degrees to about six degrees.

Figure 7A:
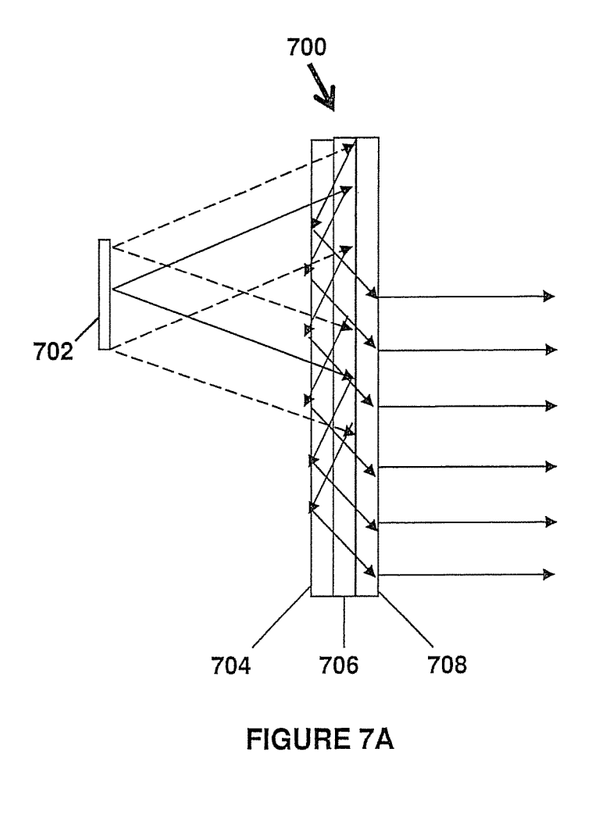
FIG. 7A shows beam propagation in diffused light collimation compound holographic optical element played back with a wide laser beam illuminated large size diffuser.
Figure 7B:
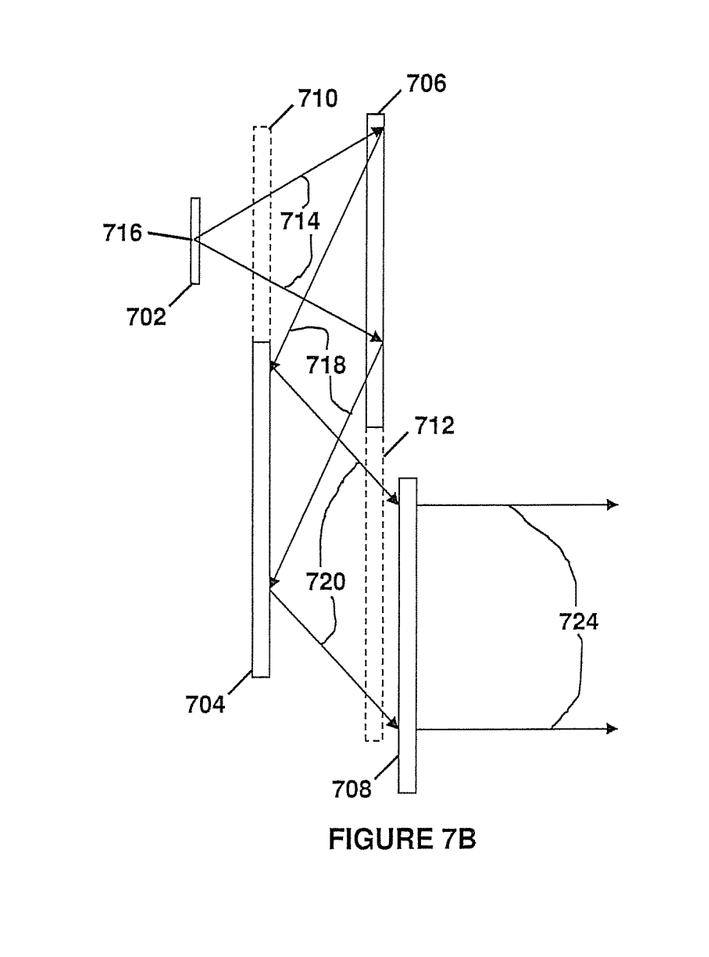
FIG. 7B shows an exploded view of FIG. 7A, simplifying the illustration of the operation by using a laser hot spot as the source of illumination.

FIGS. 7A & 7B show how playback with a compound holographic element of the present disclosure works. For illustrative purposes FIG. 7A has a wide area of incident light on diffuser 702 and FIG. 7B shows a laser hot spot incident on the diffuser 702. The exploded view of FIG. 7B is simplified by being the point source example. The optics of FIGS. 7A & 7B will also work not only with monochromatic coherent sources such as lasers, but also with diffuse light at discrete frequencies such as (but not limited to) sodium vapor lamps, that do not start as coherent light, but rather begin as multiwavelength incoherent light sources.

As shown in FIG. 7A, a compound holographic optical element 700 consists of three holographic optical elements 704, 706 & 708. First holographic optical element 704 is laminated to second holographic optical element 706, and second holographic optical element 706 is laminated to third holographic optical element 708. Exemplarily, each hologram 704, 706, & 708 has a spatial thickness of 20μm, so it is difficult to show the beam propagation in this holographic optical element, even at the exaggerated thickness shown in FIG. 7A.

FIG. 7B shows the same compound holographic optical element with first, second and third holographic optical elements (also referred to as "holograms") 704, 706 & 708 separated and shifted for beam propagation demonstration. The use of a spot source also simplifies the exploded example-relative to FIG. 7A. In FIG. 7B, the first and second holographic optical elements 704 & 706 portions outlined with solid lines are plates that have beams coming into them within the plate's Bragg conditions and are therefore handled by the holographic structure recorded in the plate. The first and second plate portions 710 & 712 representing portions of holographic optical elements 704 & 706 outlined with dashed lines represent portions where the incoming beam does not fall within the Bragg condition of the recorded hologram, and thus pass through the plate without being altered by the hologram. In the case of illuminating the diffuser with a narrow laser beam as shown in FIG. 7B, a divergent laser beam, coming from diffuser hot spot, passes through first holographic optical element 704 by not impinging within that layer's Bragg condition.

Second holographic optical element 706 is a reflection hologram configured and positioned to receive the diffused beam 714, which generally follows the path of the object beam from the recording setup, within its Bragg condition. Because the diffusive spot 716 is positioned at the focal plane of second holographic optical element 706 the first diffracted beam 718 is a copy of the collimated reference beam used for recording, and does not pass through second holographic optical element 706 rather heading somewhat backward. This first diffracted beam 718 illuminates first holographic optical element 704 within its Bragg condition. The result is that the second diffracted beam 720 is emitted as a copy of the collimated beam used for recording first holographic optical element 704. It should be noted that first holographic optical element 704, like second holographic optical element 706 is a reflection hologram. Second diffracted beam 720 passes through second holographic optical element 706 because it does not come within its Bragg condition and goes on to impinge third holographic optical element 708, which is a transmission hologram, within its Bragg condition. Third holographic optical element 708 diffracts the second diffracted beam and transmits it as collimated beam 724, which is a copy of the collimated beam used for recording third holographic optical element 708.

Figure 8A:
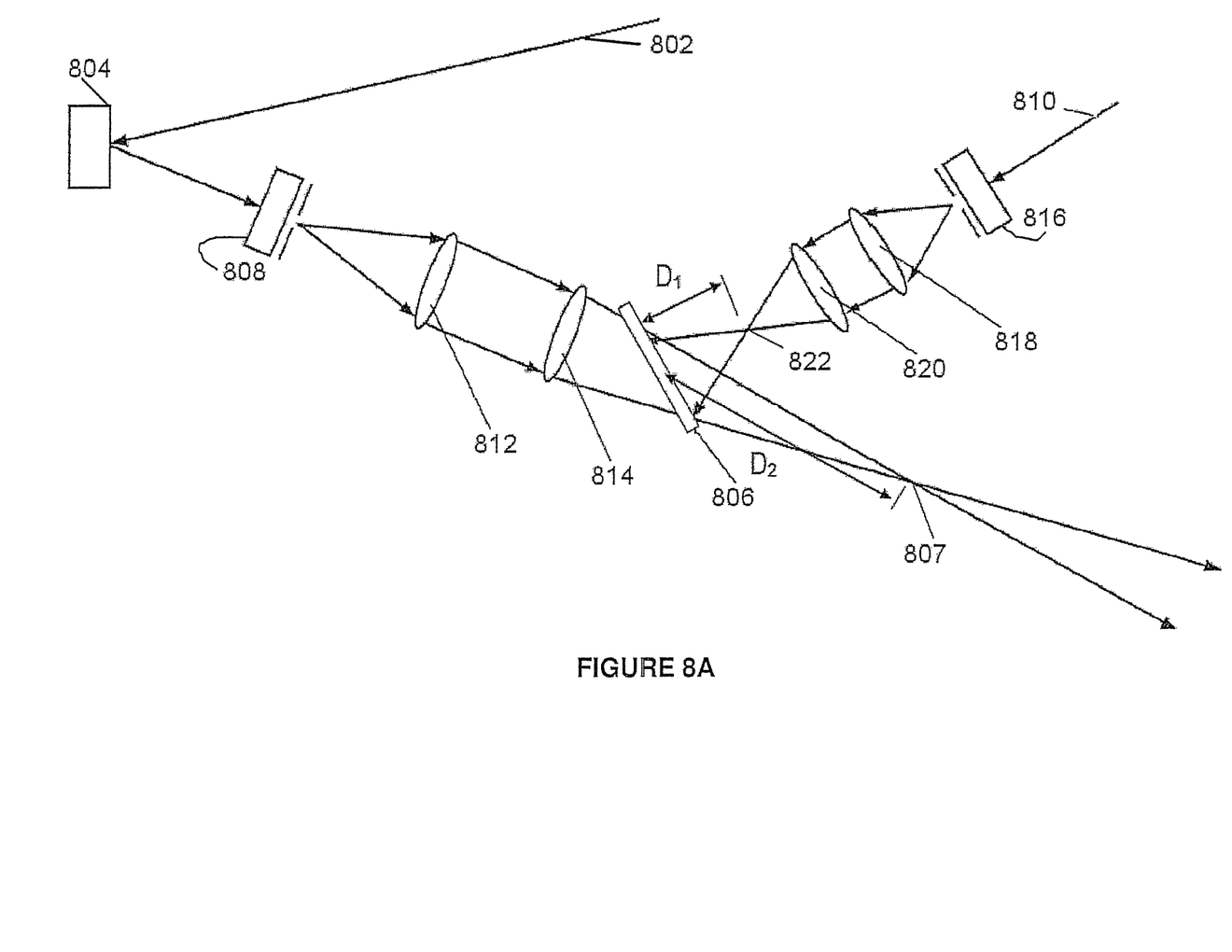
FIG. 8A shows an optical setup for recording a "continuous lens" holographic optical element with one divergent beam and one convergent beam.
Figure 8B:
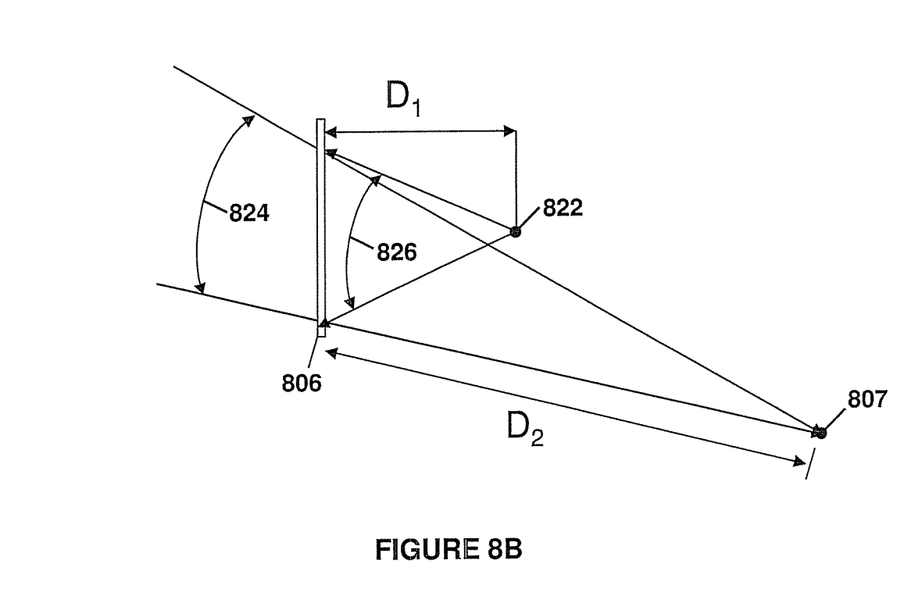
FIG. 8B is a blow-up of FIG. 8A emphasizing the optics at the site of the recording medium.

Not wishing to be bound by theory, it is thought that a reflection hologram has a higher acceptance angle, than it has as a transmission hologram. So, good results are favored by diffracting diffuse light with reflection holograms in order to maximize acceptance of the diffused light. To get an even larger acceptance angle, one can use the concept of a "continuous lens" [G. E. Moss, "*Wide-Angle Holographic Lens for a Display System,*" *J. Opt. Soc. Am.*, vol. 64, 552A, 1974] for recording second holographic optical element 706. Second holographic optical element 706 can be recorded with one divergent beam and another convergent beam as shown in FIGS. 8A & 8B. FIG. 8A is a diagram of an overall optical setup, while 8B is a blowup of the specifics with respect to the recording medium.

Referring to FIG. 8A, the unexpanded reference beam 802 strikes a reference mirror 804. The reference mirror 804 directs the light from the unexpanded reference beam 802 toward recording medium 806 through a reference beam expander 808, a reference collimating lens 812 and a reference focusing lens 814. After the reference beam passes through the recording medium 806 is reaches the reference focal point 807. The unexpanded object beam 810 enters an object beam expander 816 on its way toward recording medium 806 through object collimating lens 818 and object focusing lens 820. The object beam focal point 822 of the object focusing lens 820 is between object focusing lens 820 and the recording medium 806. After being developed and fixed, the recording medium is a "continuous lens" holographic optical element.

Referring to FIG. 8B, the reference beam 824 strikes recording medium 806 at an angle with respect to normal, while object beam 826 strikes the recording medium generally straight-on. While reference beam 824 and object beam 826 strike the recording medium 806 from opposite sides of the recording medium, the reference beam focal point 807 and the object beam focal point 822 are on the same side of the recording medium. $D_1$ is the distance from the object beam focal point 822 and the closest point of the recording medium 806 and $D_2$ is the distance from the reference beam focal point 807 and the farthest point of the recording medium.

During playback from a nearly-spot source laser beam a diffuser (not shown) is positioned at the effective focal point (not shown) of the system. It should be noted that the focus of the system now is not the focus of the hologram as in the case of recording with one divergent and one collimated beam.

The effective focal length F (not shown) of this "continuous lens" holographic optical element is given by Equation 1

$$1/F = 1/D_1 + 1/D_2 \qquad \text{(Eq. 1)}$$

Those of ordinary skill in the art can derive values of $D_1$ and $D_2$ based on the required distance between the diffuser and the holographic optical element, and on the availability of required optics.

Figure 9:
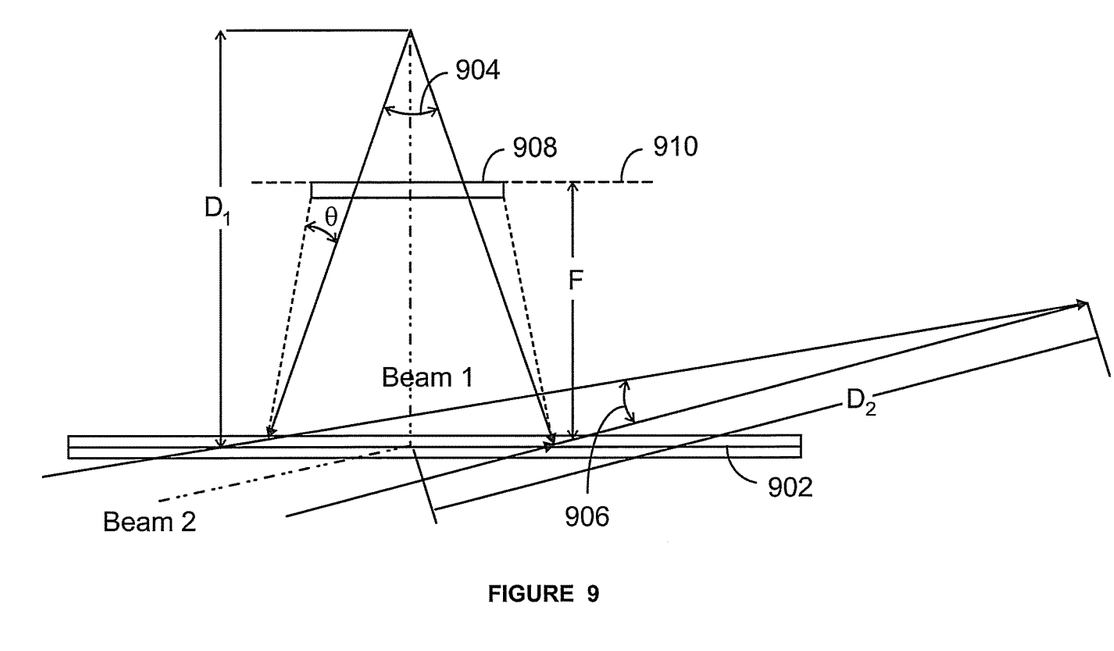
FIG. 9 is an example of reflection holographic optical element recording and playback with diffuse light incident on a continuous lens.
Figure 10:
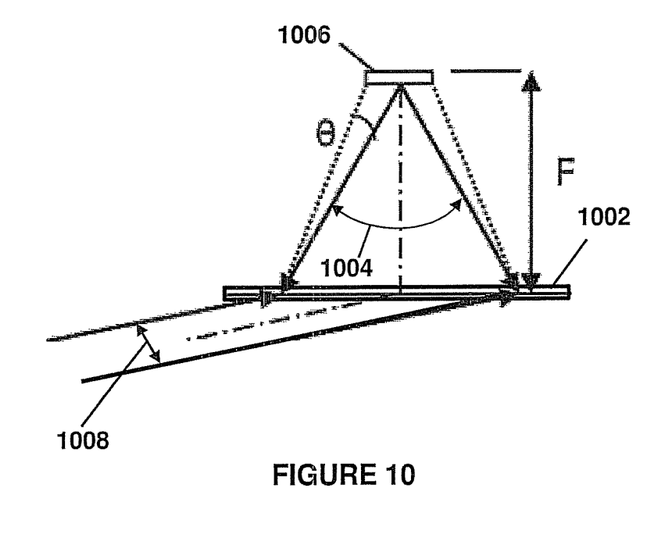
FIG. 10 is an example of reflection holographic optical element recording and playback with diffuse light incident on a regular holographic optical element.

FIG. 9 shows an example of a "continuous lens" reflection holographic optical element 902 recorded with divergent object beam 904 and convergent reference beam 906 and played back with diffuse light. $D_1$, $D_2$ have the same definition as for the discussion of FIG. 9 and Equation 1, and illustrate the optics of the recording beams. F is the distance between the "continuous lens" reflection holographic optical element 902 and the continuous lens focal plane 910. The diffuser 908 is positioned at the continuous lens focal plane for obtaining a collimated beam (not shown). For comparison, FIG. 10 shows a schematic of recording an ordinary reflection holographic optical element 1002 with divergent object beam 1004 and collimated reference beam 1008, and playback with diffuse light. The focal plane of the holographic optical element system now coincides with the recording distance $D_1$, but the acceptance angle is smaller than for the "continuous lens"; accordingly, the size of the diffuser that the hologram can accept now is smaller than with the "continuous lens" at the same acceptance angle θ.

In both FIGS. 9 and 10, the difference between the angles θ at which the diffuser is seen from the hologram and the angle of divergent object beam 904 is almost the same, but the diffuser 908 is more than twice as large as diffuser 1006. Therefore, a holographic lens recorded as shown in FIG. 9 has a lower Bragg angle selectivity and a wider acceptance angle than one recorded as shown in FIG. 10.

Referring back to the FIG. 7B, because second holographic optical element 706 is collecting diffused beam 714 efficiently and diffracting it to first holographic optical element 704 with the divergence not exceeding the angular selectivity of first holographic optical element 704, first holographic optical element 704 diffracts it efficiently to third holographic optical element 708. In general, it is thought that third transmission holographic optical element 708 has a lower acceptance angle than reflection holographic optical elements 704 & 706. To adjust the beam 720 divergence so that it is efficiently accepted by third holographic optical element 708, the position of the diffuser 702 may need to be adjusted slightly.

The first and third holographic optical elements 704 & 708 are regular holograms. Each is recorded using two collimated beams. The angles of incident of these beams onto the recording medium are chosen so that the beam direction diffracted by the previous hologram matches the direction of the incoming beam for the next hologram. The final beam diffracted out by the last hologram (third holographic optical element 708) is directed in the direction as needed by recording the recording medium for the third holographic optical element 708 to execute that output angle. In this case, it is the direction of the beam coming out of the diffuser, and will often output the final beam in line with the incoming beam, but can go other directions as desired by a person of ordinary skill in the art.

The description of the compound holographic optical element, provided above, for collimating the monochrome diffused light with the wavelength bandwidth determined by the hologram wavelength selectivity can be expanded to the case of light emitting diodes providing white light. To collimate the white light all three holographic optical elements 704, 706 & 708 should be recorded as wavelength multiplexed holograms using a 3-color holographic laser setup. An example of this recording setup is shown in FIG. 11.

Figure 11:
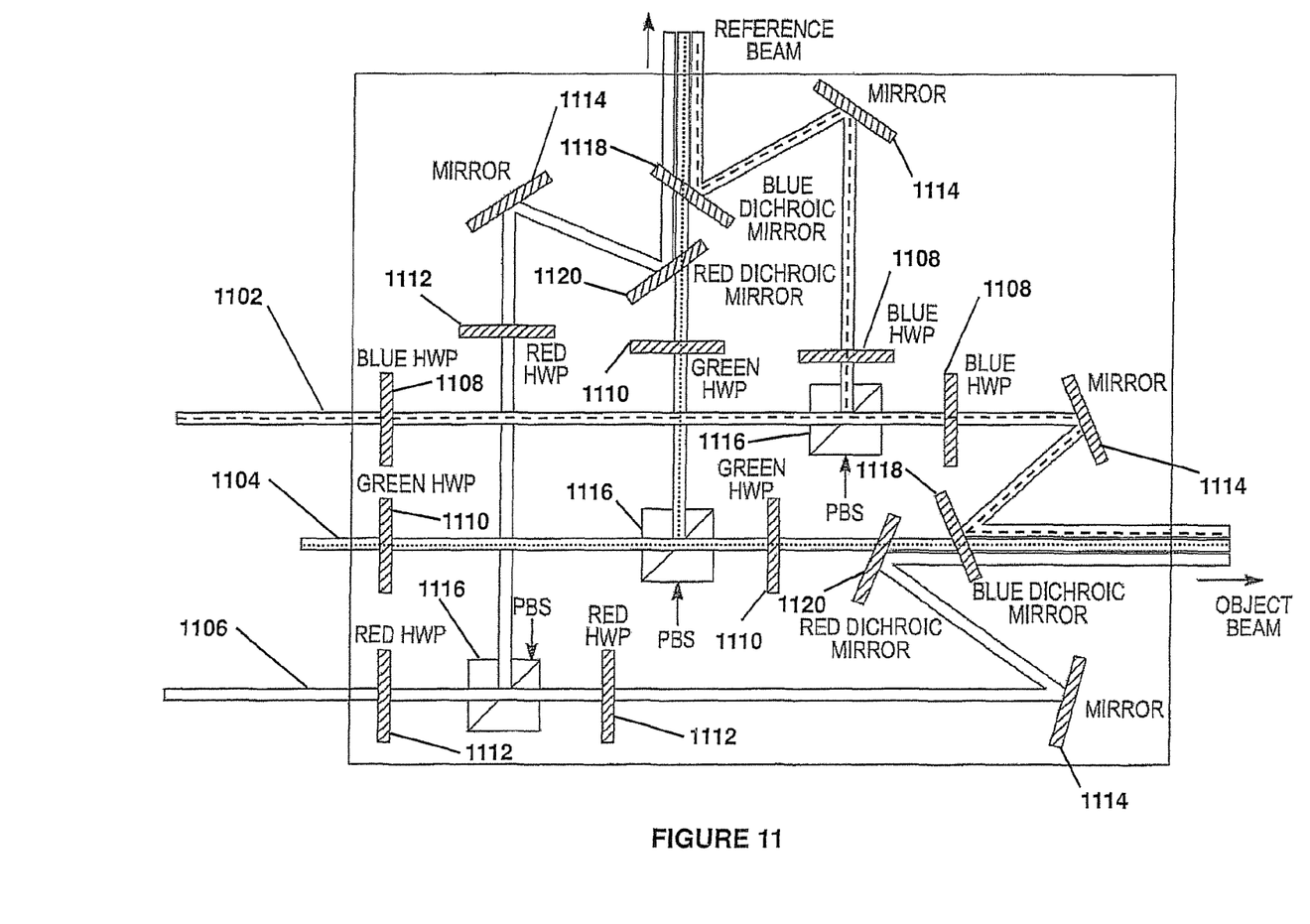
FIG. 11 shows an RGB laser color mixing breadboard in schematic.

FIG. 11 shows a schematic for an RGB laser color mixing breadboard. First beam 1102 (dashed) represents blue light, exemplarily from an argon laser at 457 nm. Second beam 1104 (dotted) represents green light, exemplarily from a Verdi laser at 532 nm. Third beam 1106 represents red light, exemplarily from a krypton laser at 647 nm. Blue HWPs (half-wave plates) 1108 are present on a few places on the board as is true for the green HWPs (half-wave plates) 1110 and red HWPs (half-wave plates) 1112. There are multiple ordinary mirrors 1114. There are PBSs 1116 on the board as well. Finishing off the setup are blue 1118 and red 1120 dichroic mirrors.

Figure 12:
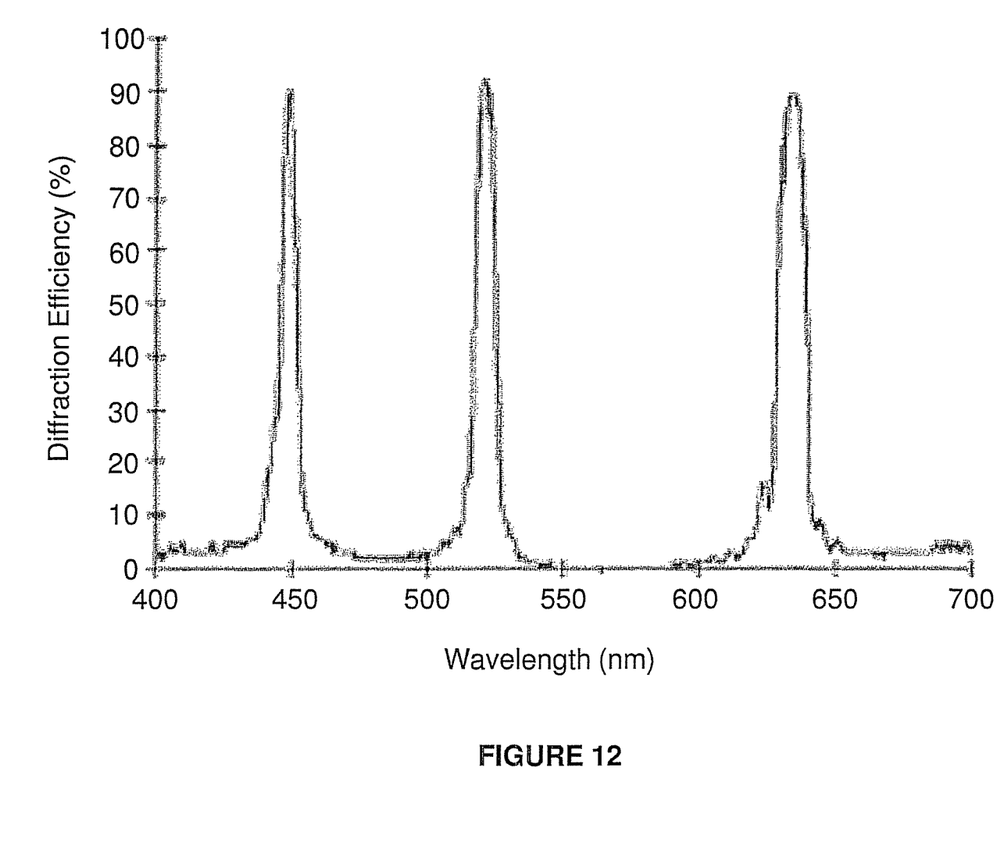
FIG. 12 shows a chart of the wavelength selectivity of reflection hologram recorded on color photopolymer.

To record a 3-color hologram successfully on holographic polymer, the polymer used to make the hologram should be sensitized to all 3 laser wavelengths. An example of a polymer that is sensitized to all 3 wavelengths is DuPont holographic polymer HRF-700X227-3*0.5*0.5. Reflection hologram wavelength selectivity recorded on this polymer is shown in FIG. 12 [B. Monroe, *'Improved Photopolymers for Holographic Recording, II, Mechanism of Hologram Formation'*, *Journal of Imaging Science*, Vol. 35, pp. 25-29, 1991].

FIG. 12 shows a chart of the wavelength selectivity of a reflection hologram recorded on color photopolymer HRF-700X227-3*0.5*0.5 manufactured by DuPont. In FIG. 12, the bandwidth at each of three wavelengths has a full width at half maximum (FWHM) of ~20 nm. These bandwidths match with the FWHM spectra of color Luxeon light emitting diodes available from Lumileds [www.philipslumileds.com, *Luxeon Rebel Direct Color Portfolio*, 2010].

What is claimed is:

1. A collimator for collimating diffused light consisting of: holographic optical elements;
   a first reflection holographic optical element that is a continuous lens configured to receive light from a diverging light beam and diffract the light beam as a first collimated light beam;
   a second holographic optical element receives the diverging light beam and transmits the diverging light beam to the first reflection holographic optical element;
   the second holographic optical element having a portion comprising a second holographically reflective structure for receiving, diffracting the light from the first collimated light beam as a second collimated light beam, and transmitting the second collimated light beam through a transmission holographic optical element and
   a third holographic optical element for receiving the second collimated light beam and diffracting it as a third collimated light beam.

2. A collimator comprising:
   a first reflection holographic optical element having recorded within it a first volume that constitutes a first holographically reflective structure, the first holographically reflective structure receiving diffused light from a diverging light beam and diffracting the received diffused light as a first collimated light beam;
   a second reflection holographic optical element having recorded within it a second volume that constitutes a second holographically reflective structure that transmits the diffused light from the diverging light source it to reach the first reflection holographic element, the second reflection holographic element having a portion comprising a second volume that constitutes a second holographically reflective structure, the second holographically reflective structure receiving the first collimated light beam and diffracting the first collimated light beam as a second collimated light beam;
   a transmission holographic optical element having recorded within it a third volume hologram, the third volume hologram receiving the second collimated light beam and diffracting it as a third holographic light beam.

3. The collimator of claim 2 where the first holographically reflective structure is configured to receive diffused light from a member of the group consisting of: a narrow laser source, a wide laser source, and a broadband source.

* * * * *